(12) United States Patent
Bradley

(10) Patent No.: US 10,968,143 B2
(45) Date of Patent: *Apr. 6, 2021

(54) THREE-PART PLANT NUTRIENT SYSTEM

(71) Applicant: HGCI, Inc., Las Vegas, NV (US)

(72) Inventor: Treg Bradley, Chandler, AZ (US)

(73) Assignee: HGCI, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,391

(22) Filed: Feb. 17, 2020

(65) Prior Publication Data

US 2020/0255352 A1 Aug. 13, 2020

Related U.S. Application Data

(63) Continuation of application No. 16/100,299, filed on Aug. 10, 2018, now Pat. No. 10,562,826, which is a continuation of application No. 14/978,052, filed on Dec. 22, 2015, now Pat. No. 10,047,016, which is a continuation of application No. 14/245,906, filed on Apr. 4, 2014, now Pat. No. 9,221,721.

(60) Provisional application No. 61/809,560, filed on Apr. 8, 2013.

(51) Int. Cl.
| | |
|---|---|
| C05B 17/02 | (2006.01) |
| C05B 17/00 | (2006.01) |
| C05D 1/00 | (2006.01) |
| C05D 3/00 | (2006.01) |
| C05D 5/00 | (2006.01) |
| C05D 9/02 | (2006.01) |
| C05G 3/40 | (2020.01) |

(52) U.S. Cl.
CPC .............. *C05B 17/02* (2013.01); *C05B 17/00* (2013.01); *C05D 1/00* (2013.01); *C05D 3/00* (2013.01); *C05D 5/00* (2013.01); *C05D 9/02* (2013.01); *C05G 3/40* (2020.02)

(58) Field of Classification Search
CPC ....................................................... C05B 17/02
See application file for complete search history.

(56) References Cited

U.S. PATENT DOCUMENTS

| | | | | |
|---|---|---|---|---|
| 4,652,294 | A * | 3/1987 | Arnold ..................... | C05G 1/00 71/28 |
| 5,114,459 | A | 5/1992 | Peters et al. | |
| 5,942,012 | A | 8/1999 | Kumasaka et al. | |
| 9,073,798 | B1 | 7/2015 | Brooke | |
| 9,221,721 | B1 * | 12/2015 | Bradley .................. | C05B 17/02 |
| 10,047,016 | B2 * | 8/2018 | Bradley .................. | C05B 17/00 |
| 2004/0200248 | A1 | 10/2004 | Kirkegaard | |
| 2005/0022569 | A1 * | 2/2005 | Varshovi ................. | C05F 11/08 71/6 |
| 2014/0323297 | A1 | 10/2014 | Harman et al. | |

* cited by examiner

*Primary Examiner* — Wayne A Langel
(74) *Attorney, Agent, or Firm* — Ulmer & Berne LLP

(57) ABSTRACT

The present invention is incorporated in a three-part primary nutrient system for facilitating the growth of a plant in any growing media. The first part of the nutrient system comprises calcium and nitrogen and is devoid of phosphorus, potassium, magnesium, sulfur, and trace minerals. The second part of the nutrient system comprises nitrogen, phosphorus, potassium, magnesium, sulfur, and trace minerals and is devoid of calcium. The third part of the nutrient system comprises potassium, phosphorus, magnesium, sulfur, and trace minerals and is devoid of nitrogen and calcium.

11 Claims, 4 Drawing Sheets

KIND LIQUID NUTRIENT SYSTEM
(in % weight/weight)

| Base | Grow | Bloom | |
|---|---|---|---|
| 4 | 2 | 0 | Total Nitrogen |
| 3.6 | 1.4 | 0 | Nitrate |
| 0.4 | 0.6 | 0 | Ammonium |
| 0 | 2 | 6 | Phosphorus (P2O5) |
| 0 | 4 | 6 | Potassium (K2O) |
| 5 | 0 | 0 | Calcium |
| 0 | 1.6 | 1.6 | Magnesium |
| 0 | 2 | 2.75 | Sulfur |
| 0 | 0.14 | 0.13 | Iron |
| 0 | 0.03 | 0.04 | Boron |
| 0 | 0.002 | 0.002 | Copper |
| 0 | 0.06 | 0.08 | Manganese |
| 0 | 0.001 | 0.001 | Molybdenum |
| 0 | 0.004 | 0.005 | Zinc |

| Growth Stage | Seedings | Vegetative | | | Bloom Transition | | | | Flowering/Fruiting | | | Ripening | Flush |
|---|---|---|---|---|---|---|---|---|---|---|---|---|---|
| Photoperiod | 18 | 18 | 18 | 18 | 12 | 12 | 12 | 12 | 12 | 12 | 12 | 12 | 12 |
| Number of Weeks | Week 1 | Week 2 | Week 3 | Week 4 | Week 1 | Week 2 | Week 3 | Week 4 | Week 5 | Week 6 | Week 7 | Week 8 | Week 9 |
| Dilution | mL/gal | mL/gal | mL/gal | mL/gal | mL/gal | mL/gal | mL/gal | mL/gal | mL/gal | mL/gal | mL/gal | mL/gal | mL/gal |
| KIND Base | 6 | 8 | 8 | 10 | 10 | 10 | 10 | 10 | 10 | 10 | 10 | 5 | 0 |
| KIND Grow | 8 | 8 | 10 | 10 | 10 | 10 | 0 | 0 | 0 | 0 | 0 | 0 | 0 |
| Kind Bloom | 0 | 0 | 0 | 0 | 0 | 0 | 16 | 16 | 16 | 16 | 16 | 8 | 0 |
| ELEMENT | ppm | ppm | ppm | ppm | ppm | ppm | ppm | ppm | ppm | ppm | ppm | ppm | ppm |
| Nitrogen | 105 | 126 | 137 | 158 | 158 | 158 | 105 | 105 | 105 | 105 | 105 | 53 | 0 |
| Nitrate | 86 | 105 | 113 | 132 | 132 | 132 | 95 | 95 | 95 | 95 | 95 | 47 | 0 |
| Ammonium | 19 | 21 | 24 | 26 | 26 | 26 | 11 | 11 | 11 | 11 | 11 | 5 | 0 |
| Phosphorus | 18 | 18 | 23 | 23 | 23 | 23 | 110 | 110 | 110 | 110 | 110 | 55 | 0 |
| Potassium | 70 | 70 | 87 | 87 | 87 | 87 | 210 | 210 | 210 | 210 | 210 | 105 | 0 |
| Calcium | 79 | 105 | 105 | 132 | 132 | 132 | 132 | 132 | 132 | 132 | 132 | 66 | 0 |
| Magnesium | 34 | 34 | 42 | 42 | 42 | 42 | 67 | 67 | 67 | 67 | 67 | 34 | 0 |
| Sulfur | 42 | 42 | 53 | 53 | 53 | 53 | 116 | 116 | 116 | 116 | 116 | 58 | 0 |
| Iron | 2.95 | 2.95 | 3.68 | 3.68 | 3.68 | 3.68 | 5.47 | 5.47 | 5.47 | 5.47 | 5.47 | 2.74 | 0 |
| Boron | 0.63 | 0.63 | 0.79 | 0.79 | 0.79 | 0.79 | 1.68 | 1.68 | 1.68 | 1.68 | 1.68 | 0.84 | 0 |
| Copper | 0.04 | 0.04 | 0.05 | 0.05 | 0.05 | 0.05 | 0.08 | 0.08 | 0.08 | 0.08 | 0.08 | 0.04 | 0 |
| Manganese | 1.26 | 1.26 | 1.58 | 1.58 | 1.58 | 1.58 | 3.37 | 3.37 | 3.37 | 3.37 | 3.37 | 1.68 | 0 |
| Molybdenum | 0.02 | 0.02 | 0.03 | 0.03 | 0.03 | 0.03 | 0.04 | 0.04 | 0.04 | 0.04 | 0.04 | 0.02 | 0 |
| Zinc | 0.08 | 0.08 | 0.11 | 0.11 | 0.11 | 0.11 | 0.21 | 0.21 | 0.21 | 0.21 | 0.21 | 0.21 | 0 |
| Kind Base | 0.60 | 0.80 | 0.80 | 1.00 | 1.00 | 1.00 | 1.00 | 1.00 | 1.00 | 1.00 | 1.00 | 0.50 | 0.00 |
| Kind Grow | 0.80 | 0.80 | 1.00 | 1.00 | 1.00 | 1.00 | 0.00 | 0.00 | 0.00 | 0.00 | 0.00 | 0.00 | 0.00 |
| Kind Bloom | 0.00 | 0.00 | 0.00 | 0.00 | 0.00 | 0.00 | 1.28 | 1.28 | 1.28 | 1.28 | 1.28 | 0.64 | 0.00 |
| Approximate EC | 1.40 | 1.60 | 1.80 | 2.00 | 2.00 | 2.00 | 2.28 | 2.28 | 2.28 | 2.28 | 2.28 | 1.14 | 0.00 |
| Approx.ppm (700 scale) | 980 | 1120 | 1260 | 1400 | 1400 | 1400 | 1596 | 1596 | 1596 | 1596 | 1596 | 798 | 0 |

Fig. 1

| Nutrient ppm (mL/gal) | | | |
|---|---|---|---|
| NUTRIENT | Base | Grow | Bloom |
| Total Nitrogen | 10.5 | 5.3 | 0.0 |
| Nitrate | 9.5 | 3.7 | 0.0 |
| Ammonium | 1.1 | 1.6 | 0.0 |
| Phosphorus | 0.0 | 2.3 | 6.9 |
| Potassium | 0.0 | 8.7 | 13.1 |
| Calcium | 13.2 | 0.0 | 0.0 |
| Magnesium | 0.0 | 4.2 | 4.2 |
| Sulfur | 0.0 | 5.3 | 7.2 |
| Iron | 0.00 | 0.37 | 0.34 |
| Boron | 0.00 | 0.08 | 0.11 |
| Copper | 0.00 | 0.01 | 0.01 |
| Manganese | 0.00 | 0.16 | 0.21 |
| Molybdenum | 0.00 | 0.00 | 0.00 |
| Zinc | 0.00 | 0.01 | 0.01 |

Fig. 2

KIND LIQUID NUTRIENT SYSTEM
(in % weight/weight)

| Base | Grow | Bloom | |
|---|---|---|---|
| 4 | 2 | 0 | Total Nitrogen |
| 3.6 | 1.4 | 0 | Nitrate |
| 0.4 | 0.6 | 0 | Ammonium |
| 0 | 2 | 6 | Phosphorus (P2O5) |
| 0 | 4 | 6 | Potassium (K2O) |
| 5 | 0 | 0 | Calcium |
| 0 | 1.6 | 1.6 | Magnesium |
| 0 | 2 | 2.75 | Sulfur |
| 0 | 0.14 | 0.13 | Iron |
| 0 | 0.03 | 0.04 | Boron |
| 0 | 0.002 | 0.002 | Copper |
| 0 | 0.06 | 0.08 | Manganese |
| 0 | 0.001 | 0.001 | Molybdenum |
| 0 | 0.004 | 0.005 | Zinc |

Fig. 3

KIND POWDERED NUTRIENT SYSTEM
(in % weight/weight)

| | Base | Grow | Bloom |
|---|---|---|---|
| Total Nitrogen | 14 | 9 | 0 |
| Nitrate | 12 | 9 | 0 |
| Ammonium | 2 | 0 | 0 |
| Phosphorus($P_2O_5$) | 0 | 9 | 25 |
| Potassium ($K_2O$) | 0 | 18 | 25 |
| Calcium | 17 | 0 | 0 |
| Magnesium | 0 | 6.7 | 6 |
| Sulfur | 0 | 9 | 10 |
| Iron | 0 | 0.5 | 0.5 |
| Boron | 0 | 0.08 | 0.08 |
| Copper | 0 | 0.02 | 0.02 |
| Manganese | 0 | 0.06 | 0.06 |
| Molybdenum | 0 | 0.01 | 0.01 |
| Zinc | 0 | 0.02 | 0.02 |

Fig. 4

THREE-PART PLANT NUTRIENT SYSTEM

CROSS-REFERENCE TO RELATED APPLICATIONS

The present application is a continuation of U.S. patent application Ser. No. 16/100,299, filed Aug. 10, 2018, now U.S. Pat. No. 10,562,826, issued Feb. 18, 2020, which is a continuation of U.S. patent application Ser. No. 14/978,052, filed Dec. 22, 2015, now U.S. Pat. No. 10,047,016, issued Aug. 14, 2018, which is a continuation-in-part application of U.S. patent application Ser. No. 14/245,906, filed Apr. 4, 2014, now U.S. Pat. No. 9,221,721, issued Dec. 29, 2015, which claims benefit of U.S. Provisional Application No. 61/809,560, filed Apr. 8, 2013, and which are entirely incorporated herein by reference.

FIELD OF THE INVENTION

The present invention relates to a three-part primary nutrient system for facilitating the growth of a plant in any growing media.

BACKGROUND

Mineral nutrition plays a crucial role in the biochemical economy of green plants. As autotrophic organisms, plants synthesize all of the organic compounds they need for survival from inorganic mineral elements, most of which are derived from the soil.

Plant physiologists have determined that among the 90 or so chemical elements that occur in the earth's crust and atmosphere there are at least sixteen (16) elements that are essential for plant growth. An element is deemed to be essential if, in its absence, a plant fails to grow properly and complete its life cycle in a normal manner. The essential elements are listed in Table 1.

TABLE 1

| The Essential Elements and their Chemical Symbols | | | |
|---|---|---|---|
| Hydrogen—H | Carbon—C | Oxygen—O | Nitrogen—N |
| Potassium—K | Calcium—Ca | Magnesium—Mg | Phosphorous—P |
| Sulfur—S | Chlorine—Cl | Boron—B | Iron—Fe |
| Manganese—Mn | Zinc—Zn | Copper—Cu | Molybdenum—Mo |

TABLE 2

| Major Elements | | | |
|---|---|---|---|
| Hydrogen—H | Carbon—C | Oxygen—O | Nitrogen—N |
| Potassium—K | Calcium—Ca | Magnesium—Mg | Phosphorous—P |
| Sulfur—S | | | |

TABLE 3

| Minor Elements | | | |
|---|---|---|---|
| Manganese—Mn | Chlorine—Cl | Boron—B | Iron—Fe |
| | Zinc—Zn | Copper—Cu | Molybdenum—Mo |

Biological Role of Essential Elements

The essential elements listed in Table 1, are arbitrarily classified as major (macro) or minor (micro), based on the relative amount of each element taken up and utilized by plants. According to most classification schemes, the elements, hydrogen through sulfur (see table 2) are regarded as major elements; the remaining seven (7) are grouped as minor elements (see table 3), commonly called "trace minerals." Generally speaking, the major elements function as structural components of plant metabolites, besides acting as co-factors for enzymatic reactions. Trace minerals primarily function as co-factors for enzymes.

SUMMARY OF THE INVENTION

The present invention is incorporated in a three-part primary nutrient system for facilitating the growth of a plant in any growing media. The first part of the nutrient system comprises calcium and nitrogen and is devoid of phosphorus, potassium, magnesium, sulfur, and trace minerals. The second part of the nutrient system comprises phosphorous, potassium, sulfur, nitrogen, magnesium, and trace minerals and is devoid of calcium. The third part of the nutrient system comprises phosphorous, potassium, sulfur, magnesium, and trace minerals and is devoid of nitrogen and calcium.

The structure, overall operation and technical characteristics of the present invention will become apparent with the detailed description of a preferred embodiment and the illustration of the related drawings as follows.

BRIEF DESCRIPTION OF THE DRAWINGS OR PICTURES

FIG. 1 illustrates a program for implementing an embodiment of the system.

FIG. 2 illustrates a program for implementing an embodiment of the system.

FIG. 3 illustrates a program for implementing a liquid formulation embodiment of the system.

FIG. 4 illustrates a program of implementing a powdered formulation embodiment of the system.

DESCRIPTION OF THE PREFERRED EMBODIMENTS

In general, this invention is embodied in a three-part nutrient system that separates the calcium from the magnesium and trace minerals allowing growers to easily customize their formulas. As discussed in more detail below, isolating calcium to the first part (base) creates a unique way for a user to selectively combine the second part (grow) and third part (bloom) to meet the specific needs of any grow media in any stage of growth while maintaining the ideal balance for optimum plant growth. Among other things, this system eliminates the need for calcium and magnesium additives or separate formulations based on grow media or water quality.

One important descriptor for each component of the three-part nutrient system is its "NPK ratio," which describes the percentage of its nitrogen, phosphorous, and potassium content respectively in an X-Y-Z format. For example, the base component preferentially has an NPK ratio of 4-0-0, meaning it comprises 4% Nitrogen, 0% phosphorous, and 0% potassium. The format of the NPK ratios enables a user to more easily calculate the amount of each of these major elements in any given mix of the three components. In components which comprise phosphorous, said components preferentially comprise said phosphorous in the form of phosphate. In components which comprise potassium, said components preferentially comprise said potassium in the form of potash.

The First Part—Base

The first part of the nutrient system ("base") functions as a catalyst for both the second and third parts and contains 100% of the calcium. It is preferred that the first part contain an NPK ratio of 4-0-0, plus 5% calcium and no phosphorus, potassium, sulfur, magnesium, or trace minerals. By keeping all the trace minerals out of the first part, a user can customize calcium and nitrogen levels without affecting the balance of these other essential elements. For example, a user using coco coir, reverse osmosis water or a plant requiring high levels of calcium and nitrogen can simply increase the amount of first part (base) to meet these specific needs. Likewise, if the grow media is clay pebbles or rockwool, or if the water is hard, a user can reduce the first part to meet these other specific needs.

The base preferably contains all of the calcium in the system which allows the grower to increase or decrease the level based on plant type, growing media, or stage of growth. It also preferably contains some of the nitrogen in the system allowing the grower to manipulate nitrogen as well.

| First Part - Base | |
| --- | --- |
| Required Elements | "Devoid of" Elements |
| Nitrogen—N | Phosphorus—P |
| Calcium—Ca | Potassium—K |
| | Magnesium—Mg |
| | Sulfur—S |
| | Trace minerals |

| First Part - Base Preferred Embodiment |
| --- |
| Nitrogen 4.0%; |
| Calcium 5.0% |
| Contains no trace minerals to allow for custom nutrient formulations |

| First Part - Base Preferred Ranges (by volume) |
| --- |
| Nitrogen 3.0%-5.1% |
| Calcium 3.8%-6.3% |
| Contains no trace minerals to allow for custom nutrient formulations |

The Second Part—Grow

The second part ("grow") comprises nitrogen, phosphorus, potassium, magnesium, sulfur, and trace minerals and is devoid of calcium. It is preferred that the second part (grow) contain an NPK ratio of 2-2-4. The second part is designed for the vegetative period of the growth cycle, but when used in combination with the other parts meets the precise demands of a plant in any media, at any stage.

The grow part preferably contains the remainder of the nitrogen in the system along with phosphorus, potassium, magnesium, iron, boron, copper, manganese, molybdenum, and zinc. It is devoid of calcium, thus allowing the grower to increase all elements while keep calcium levels consistent.

| Second Part - Grow | |
| --- | --- |
| Required Elements | "Devoid of" Elements |
| Nitrogen—N | Calcium—Ca |
| Phosphorous—P | |
| Potassium—K | |
| Magnesium—Mg | |
| Sulfur—S | |
| Trace minerals | |

| Second Part - Grow Preferred Embodiment |
| --- |
| Nitrogen 2.0%; |
| Phosphate 2.0%; |
| Potash 4.0%; |
| Magnesium 1.5%; |
| Sulfur 2.0%; |
| Iron 0.12% |
| Other trace minerals including: Manganese, Zinc, Copper, Molybdenum |

| Second Part - Grow Preferred Ranges (by volume) |
| --- |
| Nitrogen 1.5%-2.5% |
| Phosphate 1.5%-3.1%; |
| Potash 2.9%-5.1%; |
| Magnesium 1%-1.9%; |
| Sulfur 1.5%-2.5%; |
| Iron 0.05%-0.15% |
| Other trace minerals including: Manganese, Zinc, Copper, Molybdenum 0.075%-0.125% |

The Third Part—Bloom

The third part ("bloom") comprises potassium, phosphorus, magnesium, sulfur, and trace minerals and is devoid of nitrogen and calcium. It is preferred that the third part (bloom) contain an NPK ratio of 0-6-6. It is also preferred that the second part have a ratio of elemental phosphorous to potassium of 1-1.2 to encourage healthy branch and stalk development, accelerate flower sets, and maximize crop yields. It is preferred that the bloom formula is always used with the base.

The bloom part preferably contains the remainder of the phosphorus, potassium, magnesium, iron, boron, copper, manganese, molybdenum, and zinc in the system. It is devoid of calcium, thus allowing the grower to increase all elements while keep calcium levels consistent. It also preferably contains high levels of phosphorus and potassium which allows the grower to increase these minerals during the blooming phase of growth.

In an alternative embodiment, the third part comprises magnesium and trace mineral at the same mass ratio as the second part. In this embodiment the third part can be used with the base and the grow formula to customize the NPK ratio due to equal amounts of magnesium and trace minerals present in both the grow formula and the bloom formula.

| Third Part - Bloom | |
|---|---|
| Required Elements | "Devoid of" Elements |
| Potassium—K | Nitrogen—N |
| Phosphorous—P | Calcium—Ca |
| Magnesium—Mg | |
| Sulfur—S | |
| Trace Minerals | |

| Third Part - Bloom Preferred Embodiment |
|---|
| Phosphate 6.0%; |
| Potash 6.0%; |
| Magnesium 1.25%; |
| Sulfur 2.0%; |
| Iron 0.12% |
| Other trace minerals including; Boron, Manganese, Zinc, Copper, Molybdenum .1% |

| Third Part - Bloom Preferred Ranges (by volume) |
|---|
| Phosphate 4.5%-7.5% |
| Potash 4.5%-7.5%; |
| Magnesium 1.7%-2.9%; |
| Sulfur 1.5%-2.5%; |
| Iron 0.08%-0.15% |
| Other trace minerals including; Boron, Manganese, Zinc, Copper, Molybdenum 0.075%-0.125% |

Preferred Method of Operation

In preferred operation, a user applies the first part to the plant to provide the calcium required during the entire growth cycle of the plant. A user applies the second part of to the plant in order to provide the plant a proper nitrogen, phosphorus and potassium level during the growth cycle. And a user applies the third part of the nutrient system to the plant in order to provide the plant a proper elemental phosphorus and potassium ratio for enhanced flowering of fast flowering annuals during the growth cycle. Example embodiments of such application are shown in FIGS. 1-4.

As shown in the example programs of FIGS. 1-4, the three part nutrient system can be adjusted to provide maximum results of plant growth depending on the media in which the plant is growing, hardness of the water, and the specific needs of the plant.

As shown in the example programs of FIGS. 3-4, the three part nutrient system can be prepared in liquid or powdered form. The numbers shown in FIGS. 3-4 represent percent weight/weight (% w/w).

While the invention has been described by means of specific embodiments, numerous modifications and variations could be made thereto by those ordinarily skilled in the art without departing from the scope and spirit of the invention set forth in the claims.

What is claimed is:

1. A three-part primary nutrient system for facilitating the growth of a plant in any growing media comprising:
    a first part comprising calcium and nitrogen and devoid of trace minerals;
    a second part comprising nitrogen and devoid of calcium; and
    a third part comprising at least one of potassium, phosphorus, sulfur, magnesium, or minor minerals and devoid of nitrogen and calcium.

2. The three-part nutrient system of claim 1, the second part further comprising trace minerals.

3. The three-part nutrient system of claim 1, wherein any one of group consisting of the first part, the second part and the third part is in liquid form.

4. The three-part nutrient system of claim 1, wherein any one of the group consisting of the first part, the second part and the third part is in powdered form.

5. The three-part nutrient system of claim 1,
    the first part further comprising nitrogen in the range of 3.0%-6.3% and calcium in the range of 2.6%-6.3%, wherein the ranges provided are by volume;
    the second part further comprising nitrogen in the range of 1.5%-2.9%, wherein the ranges provided are by volume; and
    the third part further comprising at least one of phosphate in the range of 4.5%-7.5%, potash in the range of 4.5%-7.5%, magnesium in the range of 1.0-2.9%, sulfur in the range of 1.5%-2.9%, iron in the range of 0.08%-0.35%, or minor minerals in the range of 0.075%-0.125%, wherein the ranges provided are by volume.

6. The three-part nutrient system of claim 1, the first part devoid of phosphorus, potassium, magnesium and sulfur.

7. The three-part nutrient system of claim 1, the second part further comprising phosphorus, potassium, magnesium and sulfur.

8. The three-part nutrient system of claim 1, the third part comprising at least four of potassium, phosphorus, sulfur, magnesium, or minor minerals.

9. The three-part nutrient system of claim 1,
    the first part further comprising nitrogen in the range of 3.0%-6.3% and calcium in the range of 2.6%-6.3%, wherein the ranges provided are by volume;
    the second part further comprising nitrogen in the range of 1.5%-2.9%, phosphate in the range of 1.2%-3.1%, potash in the range of 2.8%-4.8%, magnesium in the range of 1%-2.1%, sulfur in the range of 1.5%-2.9%, iron in the range of 0.05%-0.35%, and comprising trace minerals in the range of 0.075%-0.125%, wherein the ranges provided are by volume; and
    the third part further comprising phosphate in the range of 4.5%-7.5%, potash in the range of 4.5%-7.5%, magnesium in the range of 1.0-2.9%, sulfur in the range of 1.5%-2.9%, iron in the range of 0.08%-0.35%, and minor minerals in the range of 0.075%-0.125%, wherein the ranges provided are by volume.

10. A three-part primary nutrient system for facilitating the growth of a plant in any growing media comprising:
    a first part comprising nitrogen in the range of 3.0%-6.3% and calcium in the range of 2.6%-6.3%, wherein the ranges provided are by volume;
    a second part comprising nitrogen in the range of 1.5%-2.9%, wherein the range provided is by volume, and devoid of calcium; and
    a third part comprising at least one of potassium, phosphorus, sulfur, magnesium, or minor minerals and devoid of nitrogen and calcium, the third part further comprising at least one of phosphate in the range of 4.5%-7.5%, potash in the range of 4.5%-7.5%, magnesium in the range of 1.0-2.9%, sulfur in the range of 1.5%-2.9%, iron in the range of 0.08%-0.35%, or minor minerals in the range of 0.075%-0.125%, wherein the ranges provided are by volume.

11. A three-part primary nutrient system for facilitating the growth of a plant in any growing media comprising:
- a first part comprising nitrogen in the range of 3.0%-6.3% and calcium in the range of 2.6%-6.3%, wherein the ranges provided are by volume;
- a second part comprising nitrogen in the range of 1.5%-2.9%, phosphate in the range of 1.2%-3.1%, potash in the range of 2.8%-4.8%, magnesium in the range of 1%-2.1%, sulfur in the range of 1.5%-2.9%, iron in the range of 0.05%-0.35%, and comprising trace minerals in the range of 0.075%-0.125%, wherein the ranges provided are by volume, and devoid of calcium; and
- a third part comprising at least one of potassium, phosphorus, sulfur, magnesium, or minor minerals and devoid of nitrogen and calcium, the third part further comprising phosphate in the range of 4.5%-7.5%, potash in the range of 4.5%-7.5%, magnesium in the range of 1.0-2.9%, sulfur in the range of 1.5%-2.9%, iron in the range of 0.08%-0.35%, and minor minerals in the range of 0.075%-0.125%, wherein the ranges provided are by volume.

\* \* \* \* \*